(12) United States Patent
Murakoshi et al.

(10) Patent No.: US 6,893,587 B2
(45) Date of Patent: May 17, 2005

(54) METHOD OF MANUFACTURING A FOAM-MOLDED PRODUCT

(75) Inventors: Hidekazu Murakoshi, Niihama (JP); Shingo Tamura, Niihama (JP); Ichiro Matsuoka, Niihama (JP)

(73) Assignee: Nissen Chemitec Corporation, Niihama (JP)

( * ) Notice: Subject to any disclaimer, the term of this patent is extended or adjusted under 35 U.S.C. 154(b) by 81 days.

(21) Appl. No.: 10/087,828

(22) Filed: Mar. 5, 2002

(65) Prior Publication Data

US 2002/0145214 A1 Oct. 10, 2002

(30) Foreign Application Priority Data

Apr. 9, 2001 (JP) ........................................ 2001-110494

(51) Int. Cl.⁷ .............................................. B29C 44/06
(52) U.S. Cl. ........................................ 264/45.5; 264/51
(58) Field of Search .................................. 264/45.5, 51

(56) References Cited

U.S. PATENT DOCUMENTS 3,883,629 A * 5/1975 Garner et al. ................. 264/55
5,252,269 A * 10/1993 Hara et al. ................. 264/45.3
5,281,376 A * 1/1994 Hara et al. ................. 264/46.4

FOREIGN PATENT DOCUMENTS

| EP | 0 729 818 | 9/1996 |
| JP | 7-88878 | 4/1995 |
| JP | 10-180825 | 7/1998 |

* cited by examiner

Primary Examiner—Allan R. Kuhns
(74) Attorney, Agent, or Firm—Oblon, Spivak, McClelland, Maier & Neustadt, P.C.

(57) ABSTRACT

An improved method of manufacturing a foam-molded product is provided including the steps of: filling a resin containing a foaming agent into a mold cavity by injection within a time period from a time point just before completion of mold clamping to a time point after the completion of mold clamping; allowing the resin thus filled in the mold cavity to form a skin layer over a surface thereof; thereafter retracting a movable mold to define a predetermined cavity clearance between the movable mold and a stationary mold, so as to cause the foaming agent contained in an uncured portion of the resin to foam; and cooling the resin filled in the cavity mold to form a foam-molded product having a surface forming a tight skin layer and an inside portion in a foamed state.

5 Claims, 3 Drawing Sheets

METHOD OF MANUFACTURING A FOAM-MOLDED PRODUCT

BACKGROUND OF THE INVENTION

1. Field of the Invention

The present invention relates to a method of manufacturing a foam-molded product having a surface condition that is free of any silver mark or flash mark and is as good as that of a non-foamed product and hence does not require any skin material.

2. Description of the Related Art

In recent years, every industrial field including the vehicle parts industry demands that all the articles to be used therein be products that are lighter in weight than and comparable in price and performance to conventional ones. Foam molding is one of techniques that can meet this demand. Among vehicle interior trim parts such as a door trim, front trim and rear trim, for instance, there are products of the type which is affixed with a fabric skin material of which base resin is low-foamed. Though such a product is light-weight and has a good surface appearance by virtue of the skin material, the skin material may wrinkle when affixed to products of some shapes, namely rough-surface products. For this reason, applications of such products are limited.

Japanese Examined Patent Gazette No. HEI 7-77739 has proposed a method of providing a molded product that is wholly formed of a foamed material without using any skin material. This art uses molds having fitting portions that are slidable relative to each other, adjusts the cavity clearance to 1 mm or less, and injects a polypropylene resin containing a foaming agent into the molds while enlarging the cavity clearance. During the injection the cavity clearance is adjusted so that the pressure of the resin within the cavity assumes 5 to 100 $kg/cm^2$. With this state being kept, the surface of the resin in contact with the cavity surface is allowed to form a skin layer. Once the formation of the skin layer has been completed, one of the molds is moved to a predetermined position to enlarge the cavity clearance so that foaming of an uncured portion inside the resin thus filled is caused. With this state being kept, the resin is solidified by cooling and then removed from the molds, thus giving a foamed product.

Though this method is capable of molding a foamed product without using a skin material as described above, it does not necessarily yield a molded product with a good appearance because when the polypropylene resin previously mixed with the foaming agent is injected from an injection cylinder of which the inside is held at a high pressure into the mold held at atmospheric pressure, the pressure on the filling resin rapidly lowers and, hence, part of the foaming agent present adjacent the surface of the resin foams during the filling of the resin, with the result that the foam thus produced is extended or stretched by the flow of the resin thereby forming a flash mark, silver mark or a like mark on the surface of the foamed molded product in some cases.

Further, in the case of the manufacture of a molded product having a thin wall portion, it is very difficult to fill an adequate amount of the polypropylene resin containing the foaming agent into a portion of the cavity defining such a thin wall portion because the foaming agent contained in the resin filled in the cavity of the mold kept at atmospheric pressure is constantly urged to foam thereby increasing the resistance of the resin against such a thin wall defining portion of the cavity. Thus, it is possible that the resin fills the thin wall defining portion of the cavity insufficiently thereby causing incomplete formation of a thin wall portion.

SUMMARY OF THE INVENTION

The present invention is made to overcome the foregoing problems essential to the prior art. It is therefore an object of the present invention to provide a method which is capable of manufacturing a foam-molded product having a surface condition that is free of any mark such as a flash mark or a silver mark and is as good as that of a non-foamed product without any problem even if the foam-molded product has a thin wall portion.

According to the present invention, there is provided a method of manufacturing a foam-molded product, comprising the steps of:

filling a resin containing a foaming agent into a mold cavity by injection within a time period from a time point just before completion of mold clamping to a time point after the completion of mold clamping;

allowing the resin thus filled in the mold cavity to form a skin layer over a surface thereof;

thereafter retracting a movable mold to define a predetermined cavity clearance between the movable mold and a stationary mold, so as to cause the foaming agent contained in an uncured portion of the resin to foam; and cooling the resin filled in the mold cavity to form a foam-molded product having a surface forming a tight skin layer and an inside portion in a foamed state.

According to this method, the movable mold is moving toward the stationary mold, i.e., in the clamping direction when the resin containing the foaming agent is injected from an injection cylinder kept at a high pressure into the mold cavity kept at atmospheric pressure. Accordingly, the resin filled in the mold cavity is constantly applied with the pressure of clamping the molds and, hence, the resin is restrained from being foamed by the foaming agent. The aforementioned flash mark or silver mark essential to the prior art is formed because part of the foaming agent present adjacent the surface of the resin foams immediately after the injection of the resin into the mold cavity and the resulting foam is extended or stretched by the flow of the resin. With the method of the present invention, however, the foaming agent contained in the resin filled into the mold cavity is restrained from foaming as described above and, hence, the formation of such a flash mark or silver mark does not occur. In addition, the resin is filled into the mold cavity with the cavity clearance held relatively large in the mold clamping step and, accordingly, the clearance of a thin wall defining portion of the cavity is also held relatively large. Therefore, the resin, even if containing the foaming agent, is smoothly filled into such a thin wall defining portion of the cavity and thereafter the resin filling the cavity is compressed and hence extends to every corner of the cavity. Thus, it is possible to obtain a sound foam-molded product even if it has a thin wall portion.

Preferably, the amount of the resin to be filled into the mold cavity at the time point just before the completion of mold clamping is 50% to 80% of the total amount of the resin to be filled.

If the amount of the resin to be filled at the time point just before the completion of mold clamping is less than 50% of the total amount of the resin to be filled, it is possible that the formation of the skin layer is insufficient because the amount of the resin filled is too small and, as a result, a mark of foam produced in a central portion of the resin emerges on the surface of the resin. If it is more than 80%, on the other hand, the amount of the resin filled at that time is excessive, which results in insufficient foaming of the resin in a later step.

In a preferred embodiment of the present invention, the filling of the resin at the time point just before the completion of mold clamping starts within a time period from a time point five seconds before the completion of mold clamping to a time point at which mold clamping is completed.

If the filling of the resin starts at a time point more than five seconds before the completion of mold clamping, the resin filled is cooled so much by the molds that the skin layer grows too much, resulting in a problem that the later foaming becomes insufficient. On the other hand, if the filling of the resin starts after the completion of mold clamping, the resin filled is not applied with the pressure of the molds moving in the clamping direction, with the result that the foaming agent contained in the resin is not restrained from foaming and, hence, the formation of a flash mark or a silver mark cannot be avoided. In addition, if the intended product has a thin wall portion, it is difficult for the resin to enter a thin wall defining portion of the cavity sufficiently, which may result in an incomplete product with a broken wall.

In another preferred embodiment of the present invention, the resin is injected into the mold cavity at an injection speed of 5 to 20 cm/sec.

If the injection speed is lower than 5 cm/sec, it is possible that a skin layer is formed on the surface of the resin being injected and is drawn by the flow of the resin to form wrinkles on the surface. On the other hand, if the injection speed is higher than 20 cm/sec, turbulence of the resin, which acts to retard the formation of a skin layer, occurs within the mold cavity, so that a mark of foam produced inside the resin emerges on the surface thereby marring the appearance of the product.

In yet another embodiment of the present invention, a time period from the starting of the filling of the resin into the mold cavity until the foaming agent contained in an inner portion of the resin filled in the mold cavity starts foaming is 3 to 10 seconds.

If this period is shorter than 3 seconds, the formation of the skin layer becomes insufficient, resulting in a product having marred appearance as described above. On the other hand, if it is longer than 10 seconds, the skin layer grows too much, causing insufficient foaming in the later step.

In still another embodiment of the present invention, a mold clamping pressure at the step of filling the resin into the mold cavity is adjusted to fall within a range between 20 kg/cm$^2$ and 100 kg/cm$^2$, while a mold clamping pressure at the step of forming the skin layer is adjusted to fall within a range between 20 kg/cm$^2$ and 80 kg/cm$^2$, provided the mold clamping pressure at the step of filling the resin into the mold cavity is substantially equal to or higher than the mold clamping pressure at the step of forming the skin layer.

The foregoing and other objects, features and attendant advantages of the present invention will become apparent from the following detailed description when read in conjunction with the accompanying drawings.

DETAILED DESCRIPTION OF THE PREFERRED EMBODIMENTS

Figure 1:
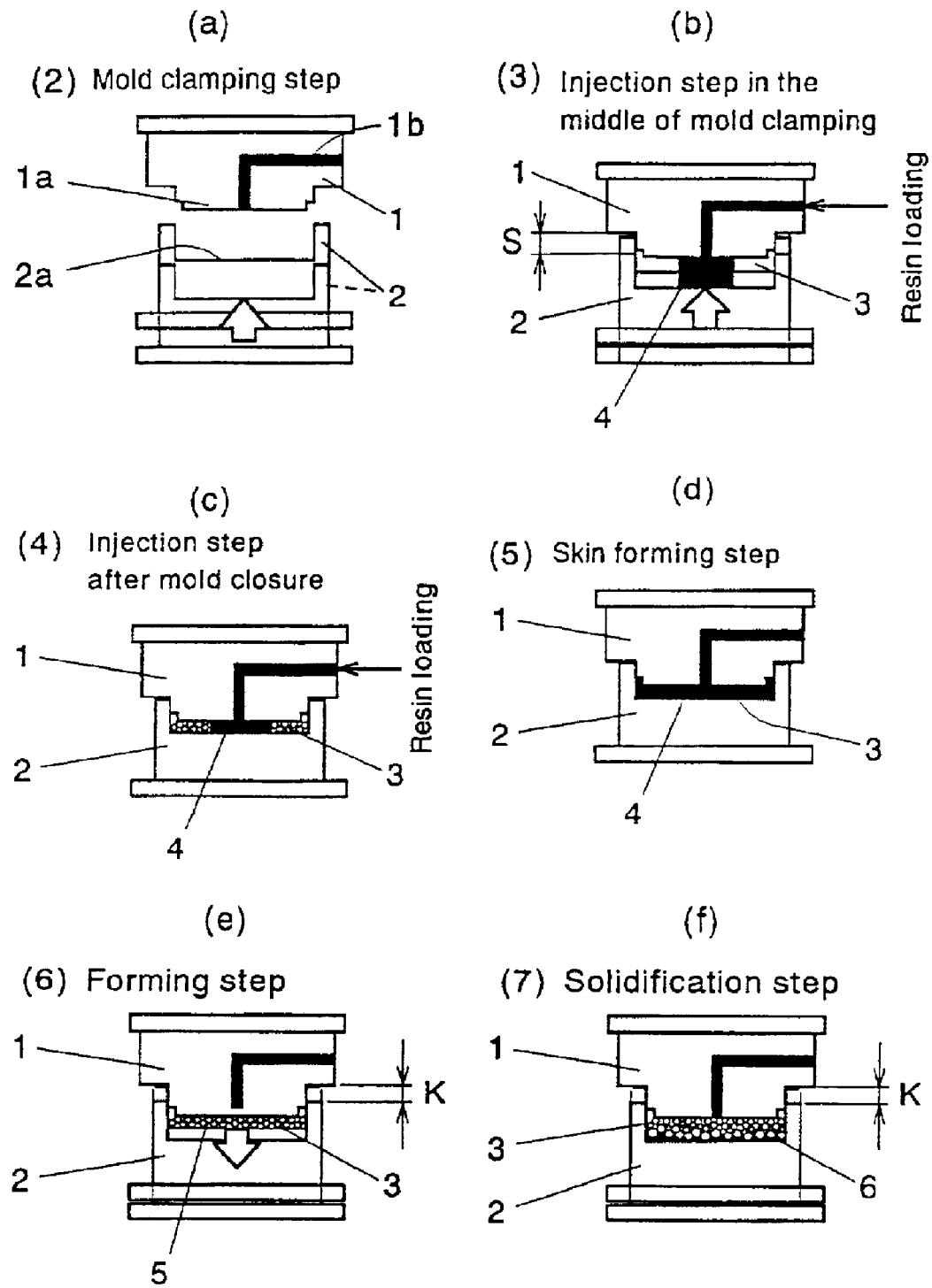
FIG. 1 illustrates a foam-molding process according to the present invention.
Figure 2:
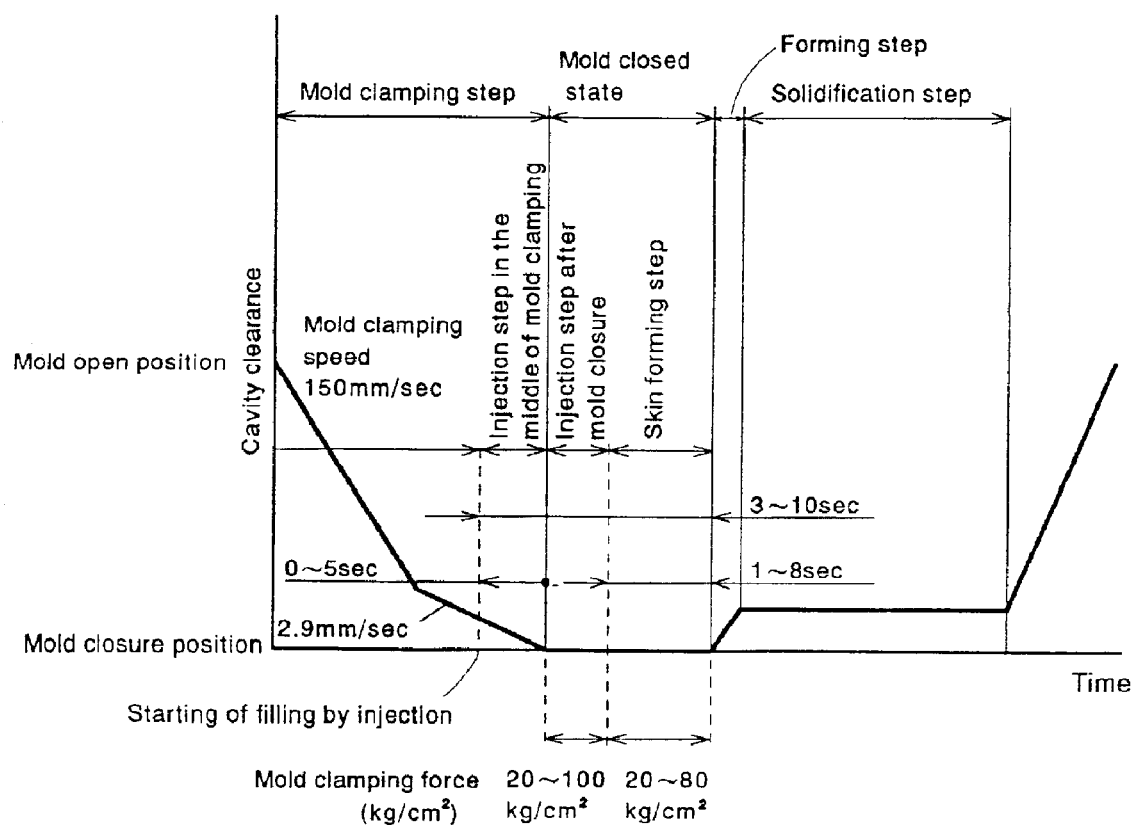
FIG. 2 is a graph showing the movement of a movable mold in the foam-molding process.
Figure 3:
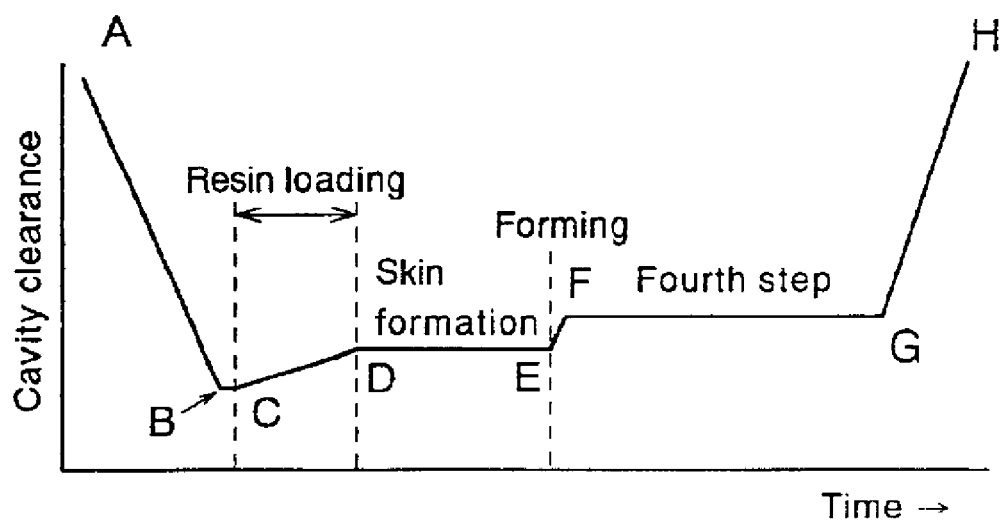
FIG. 3 is a graph showing the movement of a movable mold in a foam-molding process according to the prior art.

The present invention will now be described in detail by way of its embodiments shown in the accompanying drawings.

FIGS. 1(a) to 1(f) generally illustrate a process according to the method of the present invention. The mold used in this embodiment is adapted for stamp molding and comprises a stationary mold 1 disposed on the upper side and a vertically movable mold 2 disposed directly below the stationary mold 1. The stationary mold 1 has a lower side formed with a core 1a protruding therefrom, while the movable mold 2 has an upper side formed with a female mold 2a having a fitting portion on a side wall thereof for slidable fit over the core 1a. The stationary mold 1 defines a runner 1b through which a resin is loaded into a cavity. Though the method of the present invention is applicable to injection molding as well as to stamp molding, an embodiment applied to stamp molding is described herein as a representative embodiment of the present invention.

The resin used in the present invention is any thermoplastic resin admixed with a foaming agent without any particular limitation. In this embodiment, a polypropylene resin composition is used as a representative of such thermoplastic resins. The polypropylene resin composition comprises at least a polypropylene resin and a foaming agent. The resin composition may further comprise a propylene-α-olefin copolymer and/or a filler.

The polypropylene resin used in the resin composition comprises a propylene homopolymer, a propylene block copolymer, or a mixture thereof and usually has a melt flow rate (ASTMD-1238, 230° C., load=2.16 kg) ranging from 10 to 100 g/min. Since foam-molded products generally tend to have a lowered impact strength, it is preferable to blend a propylene-α-olefin copolymer with the resin composition or to use a propylene block copolymer having a particularly high block copolymer content in order to prevent the impact strength of an intended foam-molded product from lowering.

The propylene-α-olefin copolymer is a copolymer comprising propylene and ethylene or an α-olefin having 4 to 10 carbon atoms. This copolymer may be added to the propylene resin during or after polymerization of propylene.

The foaming agent used in the present invention may be an inorganic foaming agent such as sodium bicarbonate or sodium carbonate, or an organic foaming agent such as azodicarbonamide or azobisisobutyronitrile, or a mixture thereof. Sodium bicarbonate is most preferable. Though the foaming agent may be mixed directly with the polypropylene resin, it is preferable to use a masterbatch having a high concentration of the foaming agent in order to enhance the dispersibility of the foaming agent. In this embodiment, an organic foaming agent is added in an amount of 1% by weight to a block copolymer and the resulting composition is subjected to mixing and stirring before molding. The filler used in the present invention may be talc, calcium carbonate, glass fiber or the like. Talc or glass fiber is particularly preferable in the present invention from the viewpoint of improvements in foamability and in the rigidity of a resulting foam-molded product.

The polypropylene resin composition used in the present invention may optionally contain various additives usually used in the art unless they impair the advantages of the present invention. Examples of such additives include those typically used in combination with polypropylene such as a nucleating agent, antioxidant, light stabilizer, ultraviolet absorber, lubricant, and antistatic agent.

The temperature condition of an injection cylinder used in the foam-molding method of the present invention is as follows. A resin 4 to be foamed has been previously mixed with the foaming agent and kneaded and weighed. It is not preferable that the foaming agent foams immediately after the injection filling of the resin 4. For this reason, the present invention sets the heating temperature of the injection cylinder 5° C. to 70° C. lower than a typical molding temperature (200° C. to 230° C.) to inhibit such undesirable foaming of the foaming agent. As a preferable example, the temperature of a rear part of the injection cylinder is set at 160° C. to 190° C., while the temperature of a front part thereof set at 190° C. to 215° C. In this embodiment the temperature of the front part of the injection cylinder is set at 210° C. and that of the rear part thereof is set at 170° C. Since the temperature condition of the injection cylinder is adjusted depending upon the kind of resin used, ambient temperature at the manufacturing site, and the like, the temperature condition employed in this embodiment is only illustrative and not limitative of the present invention.

The molding method of the present invention is specifically described below.

Injection Step in the Middle of Mold Clamping and Injection Step After Mold Closure As shown in FIGS. 1(*a*) and 1(*b*), the movable mold 2 is raised toward the stationary mold 1 at a predetermined speed. When the movable mold 2 has reached a predetermined position close to the stationary mold 1, the weighed resin 4 is injected through the runner 1*b* into a mold cavity 3. The injection-filling of the resin 4 starts within a time period from a time point five seconds before the completion of mold clamping to a time point at which the mold clamping is completed. Since the timing of the injection-filling of the resin 4 upon or immediately before the completion of mold clamping is slightly late, the injection-filling timing is preferably two to four seconds before the completion of mold clamping. The injection speed is controlled so as to fall within the range between 5 cm/sec and 20 cm/sec. The amount of the resin to be filled in the mold cavity 3 up to the completion of mold clamping is 50% to 80% of the total amount of the resin to be filled. Accordingly, the rest of the resin is continuously filled into the cavity 3 after the completion of mold clamping with the molds in a closed state. The mold clamping force in the injection step after the mold closure, i.e., after the completion of mold clamping is controlled within the range between 20 kg/cm$^2$ and 100 kg/cm$^2$.

As the resin 4 containing the foaming agent is injected into the mold cavity 3 with the movable mold 2 moving in the mold clamping direction, the resin 4 is filled into the mold cavity 3 while receiving a compression stress generated by the molds 1 and 2 and, hence, the foaming agent contained in the resin 4 is restrained from foaming. Accordingly, the resin 4 can be smoothly filled into the mold cavity 3 without forming a flash mark or flow mark on the surface thereof. If the mold cavity 3 has a thin wall defining portion, even the resin 4 previously mixed with the foaming agent can easily enter such a thin wall defining portion because the thin wall defining portion also has a sufficient cavity clearance at a time point before the completion of mold clamping.

Surface Forming Step

As the resin 4 is filled into the mold cavity 3 in the foregoing injection step in the middle of mold clamping and in the injection step after mold closure, the resin 4 is cooled from its portion in contact with the mold cavity 3 of which the temperature is low, thereby forming a skin layer. If the injection speed is too high, an uncured portion of the resin 4 present inside the skin layer gives rise to turbulence, which in turn breaks the skin layer thereby causing the surface layer to become roughened. It is therefore required that the injection be performed at a proper speed. At this stage, the skin layer is still flexible and hence is held in a state capable of flexibly stretching without tear when subjected to expansion force. At this time the pressure within the mold cavity 3 is high enough (20 to 80 kg/cm$^2$) to inhibit foaming of the foaming agent contained in the resin 4 filled. The skin forming time in the surface forming step is 3 to 10 seconds. Once the skin layer has grown sufficiently, the movable mold 2 is retracted to a predetermined position to reduce the pressure in the mold cavity 3. If the skin forming time is shorter than 3 seconds, the formation of the skin layer is insufficient. If it is longer than 10 seconds, the skin layer grows too much.

Foaming step

When the pressure within the mold cavity 3 is reduced by retracting the movable mold 2 as described above, the foaming agent present in an uncured portion of the resin 4 filled in the mold cavity 3 begins foaming and, accordingly, the resin 4 is expanded conformably to the shape of the mold cavity 3. The skin layer is flexibly stretched as the foaming agent foams thereby preventing the foamed layer inside the skin layer from emerging on the surface. As a result, the foamed layer remains inside and the surface layer forms an appearance as good as that of a non-foamed product.

Solidification step

The aforementioned state in which the movable mold 2 is in a slightly retracted position is held for a predetermined time period to allow the whole resin 4 filled in the mold cavity 3 to solidify as it is cooled. When the removal of a foam-molded product 6 becomes possible, the mold is opened and the foam-molded product 6 is removed therefrom. The foam-molded product 6 has a very clear surface that is comparable to the surface of a non-foamed product and the inside thereof is in a foamed state. By properly selecting a resin material as described above, it is possible to obtain a foam-molded product having a sufficient rigidity.

EXAMPLE

In the injection step in the middle of mold clamping and in the injection step after mold closure, the resin was injected into the cavity mold under the following conditions to obtain a foam-molded product having a volume of 525 cc. The movable mold was moved at an initial clamping speed of 150 mm/sec until it reached a predetermined position and then the clamping speed was reduced to 2.9 mm/sec. The injection of the resin started when the movable mold reached a position 1.7 mm before the position at which the mold clamping was completed so that the amount of the resin to be injected in the injection step in the middle of mold clamping would reach 55% of the total amount of the resin to be injected. The injection speed in this step was as high as 8.2 cm/sec. Continuously, the rest (45%) of the resin was injected after the movable mold had been completely fitted over the stationary mold to close the mold cavity. In this way, the mold cavity was filled with the resin up to every corner.

In the surface forming step, the resin thus injected was held within the mold cavity in a closed state for about 1 to 8 seconds (2.9 seconds in this example) after the completion of injection.

In the foaming step, the movable mold was retracted by 1.8 mm to allow an uncured layer inside the skin layer to be foamed so that the thickness of a resulting foam-molded product would grow twice (1.8 to 3.6 mm) as large as the thickness of the closed mold cavity.

In the solidification step, the foam-molded product was cooled so as to solidify with its foamed state maintained. The resulting foamed product had a surface in a condition as good as a non-foamed product.

According to the method of the present invention, a resin previously mixed with a foaming agent is filled into a mold cavity by injection in the middle of mold clamping and, hence, the resin in the mold cavity is constantly applied with the pressure of compression, so that the foaming agent contained in the resin is restrained from foaming. As a result, it is possible to avoid the formation of any flash mark or silver mark, which is likely in the molding of a foamed resin. After a skin layer has been formed, an uncured portion of the resin present inside the skin layer is foamed by retracting a movable mold to reduce the pressure in the mold cavity, whereby the resin is expanded without impairing the skin layer forming the surface of the resin, resulting in a foam-mold product having a surface in a condition as good as a non-foamed product. Further, since the resin is filled into the mold cavity in the middle of mold clamping, even a resin previously mixed with the foaming agent can be smoothly filled into a thin wall defining portion of the mold cavity. Thus, it is possible to obtain a sound foam-molded product even if it has a thin wall portion.

While only a certain presently preferred embodiment of the present invention has been described in detail, as will be apparent for those skilled in the art, certain changes and modifications may be made in embodiment without departing from the spirit and scope of the present invention as defined by the following claims.

What is claimed is:

1. A method of manufacturing a product, comprising:

filling a resin containing a foaming agent into a mold cavity by injection within a time period from a time point just before completion of mold clamping to a time point after the completion of mold clamping;

allowing the resin filled in the mold cavity to form a skin layer over a surface of the resin;

retracting a movable mold to provide a predetermined cavity clearance between the movable mold and a stationary mold to cause the foaming agent to foam; and cooling the resin filled in the mold cavity to form a foam-molded product having a tight skin layer surface and an inside portion in a foamed state, wherein an amount of the resin to be filled into the mold cavity at the time point just before the completion of the mold clamping is between 50% and 80% of the total amount of the resin to be filled in the mold cavity.

2. The method according to claim 1, wherein the filling of the resin at the time point just before the completion of the mold clamping starts within a time period between five seconds before the completion of the mold clamping and the completion of the mold clamping.

3. The method according to claim 1, wherein the resin is injected into the mold cavity at an injection speed of between 5 and 20 cm/sec.

4. The method according claim 1, wherein a time period from starting of the filling of the resin into the mold cavity until the foaming agent contain in an inner portion of the resin filled in the mold cavity starts foaming is between 3 and 10 seconds.

5. The method according to claim 1, wherein a mold clamping pressure during the filling the resin into the mold cavity is between 20 kg/cm$^2$ and 100 kg/cm$^2$, and a mold clamping pressure during the allowing the resin to form the skin layer is between 20 kg/cm$^2$ and 80 kg/cm$^2$.

* * * * *